US012801734B2

(12) United States Patent
Habler et al.

(10) Patent No.: US 12,801,734 B2
(45) Date of Patent: Nov. 17, 2026

(54) AUTHORIZATION OF AUDIO INPUT FOR A MACHINE LEARNING MODEL

(71) Applicant: Intuit Inc., Mountain View, CA (US)

(72) Inventors: Idan Habler, Tel Aviv (IL); Tsofit Efroni Zazon, Tel Aviv (IL); Yael Mathov, Tel Aviv (IL); Jonathan Alexander Rabin, Kfar Saba (IL)

(73) Assignee: Intuit Inc., Mountain View, CA (US)

( * ) Notice: Subject to any disclaimer, the term of this patent is extended or adjusted under 35 U.S.C. 154(b) by 85 days.

(21) Appl. No.: 18/963,361

(22) Filed: Nov. 27, 2024

(65) Prior Publication Data

US 2026/0147882 A1 May 28, 2026

(51) Int. Cl.

| | |
|---|---|
| ***G06F 21/55*** | (2013.01) |
| ***G10L 17/02*** | (2013.01) |
| ***G10L 17/06*** | (2013.01) |
| ***G10L 17/20*** | (2013.01) |
| ***G10L 21/0208*** | (2013.01) |

(52) U.S. Cl.

CPC ............ *G06F 21/554* (2013.01); *G10L 17/02* (2013.01); *G10L 17/06* (2013.01); *G10L 17/20* (2013.01); *G10L 21/0208* (2013.01); *G06F 2221/034* (2013.01)

(58) Field of Classification Search

CPC .. G06F 21/554; G06F 2221/034; G06F 21/55; G10L 17/02; G10L 17/06; G10L 17/20; G10L 21/0208

See application file for complete search history.

(56) References Cited

U.S. PATENT DOCUMENTS 11,856,024 B2 * 12/2023 dos Santos Silva .... G10L 21/06
2020/0175961 A1 * 6/2020 Thomson ................ G10L 15/06
2020/0366671 A1 * 11/2020 Larson .................... G06F 21/32
2023/0386453 A1 * 11/2023 Nadeau ................... G10L 15/22

* cited by examiner

*Primary Examiner* — Quazi Farooqui
(74) *Attorney, Agent, or Firm* — Dinsmore & Shohl LLP

(57) ABSTRACT

Certain aspects of the disclosure provide techniques for authorizing machine learning input. An example method of authorizing machine learning input includes obtaining an audio input for a machine learning model, wherein the audio input comprises one or more sounds including a first voice; determining at least one audio feature associated with the first voice; determining the at least one audio feature associated with the first voice is within a similarity threshold of at least one stored audio feature associated with an authorized user of the machine learning model; generating a text representation of the first voice; determining an attack score for the first voice based on the text representation; determining that the attack score does not satisfy an attack threshold; and based on the attack score not satisfying the attack threshold, sending at least one of the text representation or the first voice as input to the machine learning model.

20 Claims, 8 Drawing Sheets

AUTHORIZATION OF AUDIO INPUT FOR A MACHINE LEARNING MODEL

BACKGROUND

Field

Aspects of the present disclosure relate to authorizing input for a machine learning model.

Description of Related Art

Machine learning models, e.g., multimodal large language models (LLMs), may be configured to take as input audio such as voice or spoken-word commands or phrases, and generate an output based on the input. For example, a machine learning model configured to perform as a personal assistant in a home may receive a spoken command as input, e.g., "turn on the lights in the room," and generate an output such as a control signal configured to turn on the lights in the room.

Machine learning models may also be susceptible to sophisticated exploitation, including application poisoning, prompt injection, safety-related attacks or information disclosure attempts. Application poisoning and prompt injection attacks typically encompass a multitude of strategies designed to compromise machine learning models by manipulating an output response or the functionality of the machine learning model. Safety-related attacks may try to elicit or disseminate harmful content, ranging from explicit material and abuse to malicious code generation and sensitive information disclosure, while jeopardizing user safety and privacy. Incorporating audio in the prompt, e.g., the voice command described above, may expand the attack surface, where new potential risks may be introduced, such as commands using unauthorized voices.

As a result, there is a need for techniques that authorize input for a machine learning model, which may mitigate the risk of exploitation and enhance the reliability of the machine learning model and may protect users of the machine learning model from harm.

SUMMARY

Certain aspects provide a computer-implemented method for authorizing machine learning model input. The method includes obtaining an audio input for a machine learning model, wherein the audio input comprises one or more sounds including a first voice; determining at least one audio feature associated with the first voice; determining the at least one audio feature associated with the first voice is within a similarity threshold of at least one stored audio feature associated with an authorized user of the machine learning model; generating a text representation of the first voice; determining an attack score for the first voice based on the text representation; determining that the attack score does not satisfy an attack threshold; and based on the attack score not satisfying the attack threshold, sending at least one of the text representation or the first voice as input to the machine learning model.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
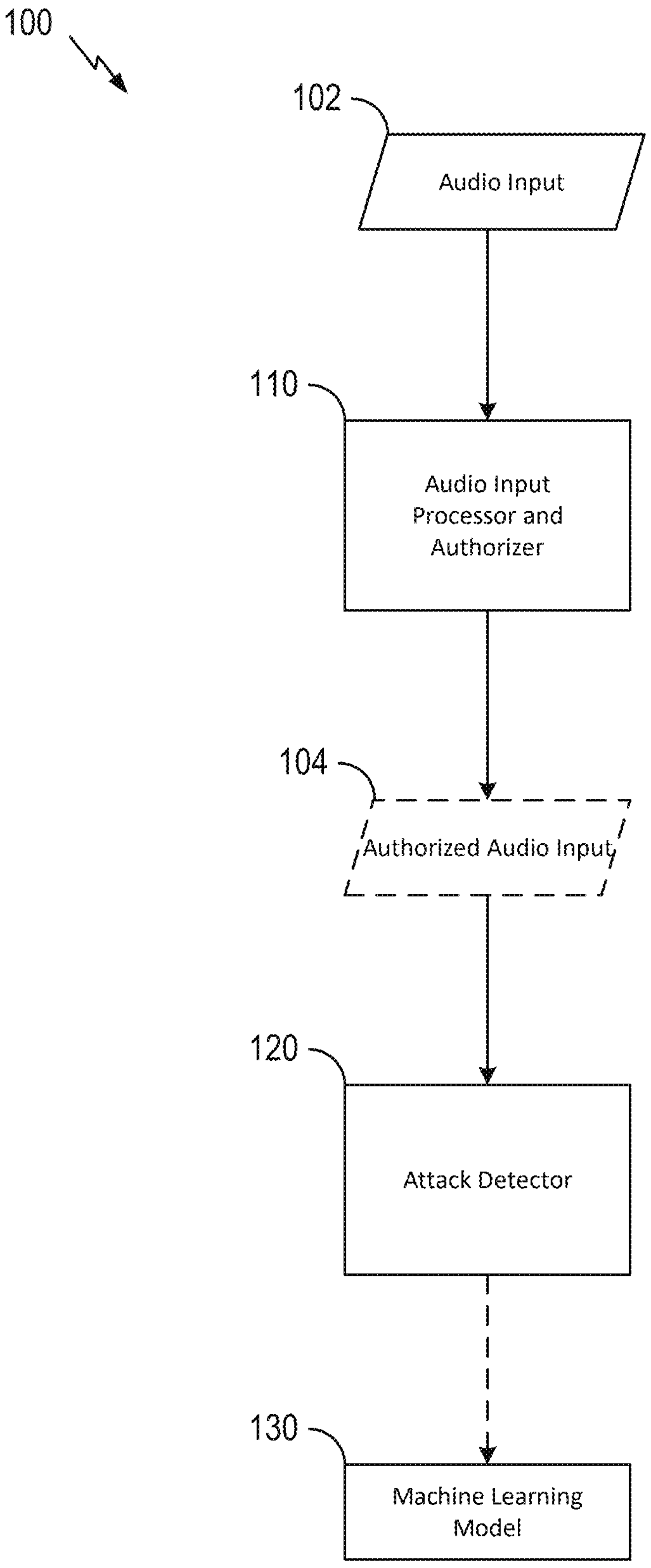
FIG. 1 depicts an example system for authorizing machine learning model input.

Aspects of the present disclosure provide apparatuses, methods, processing systems, and computer-readable mediums for authorizing audio input to a machine learning model.

A machine learning model configured to take audio input may be susceptible to a number of different types of threats. For example, one type of threat is that an unauthorized speaker (e.g., using an authorized session to access the machine learning model) provides audio input, such as voice commands, malicious voice commands, or noise, to the machine learning model. The machine learning model may process the audio input from the unauthorized speaker leading to potential adverse actions occurring, such as improper operation of control systems, unauthorized access to secure accounts, etc. Another type of threat is where an authorized speaker provides audio input, such as malicious voice commands in their own voice. The machine learning model may process the malicious commands from the authorized speaker leading to potential adverse actions occurring. As there is a shift to audio-based machine learning models, such as audio based artificial intelligence (AI) assistants, which may be powered by LLMs, such threats may pose even greater security concerns. Accordingly, there is a technical problem with respect to how to provide security for audio-based machine learning models from improper audio inputs.

Certain aspects herein provide a technical solution to the technical problem of securing audio-based machine learning models from improper audio input, such as by providing techniques for authorizing audio input for machine learning models, such as multi-stage defense mechanisms that are capable of protecting against multiple different types of threats. Certain aspects provide multi-stage audio input authorization including 1) authorizing that the audio input is from an authorized speaker, and 2) determining whether a content of the audio input is malicious or a potential attack attempt. An authorized speaker may be a speaker who is allowed to utilize a machine learning model, such as based on a policy or enrollment, while an unauthorized speaker may be a speaker who is not allowed to utilize the machine learning model. In certain aspects, if either stage fails, such as the audio input is not from an authorized speaker, or the content of the audio input is malicious or a potential attack attempt, the audio input may not be provided to the machine learning model, thereby securing the machine learning model from the audio input. In certain aspects, if both stages pass, such as the audio input is from an authorized speaker, and the content of the audio input is not malicious or a potential attack attempt, the audio input may be provided to the machine learning model.

Therefore, the multi-stage audio input authorization may provide the technical effect of securing the machine learning model from multiple different types of threats. For example, authorizing that the audio input is from an authorized speaker may prevent an unauthorized speaker from accessing the machine learning model. Further, determining whether content of the audio input is malicious or a potential attack attempt may prevent improper audio input from being used as input to the machine learning model, regardless of whether it is from an authorized speaker or an unauthorized speaker.

In certain aspects, the stages of a multi-stage audio input authorization are performed serially, such as first authorizing that the audio input is from an authorized speaker, and only if the audio input is from an authorized speaker, determining whether a content of the audio input is malicious or a potential attack attempt. Such a serial multi-stage audio input authorization may provide the technical benefit of reducing use of computational resources for processing the audio input when the audio input is from an unauthorized speaker.

In certain aspects, techniques for authorizing that the audio input is from an authorized speaker may include determining whether at least one audio feature, such as Mel-Frequency Cepstral Coefficients (MFCC), a frequency, a power, an energy, a zero-crossing rate, a tempo, a jitter, or the like, of a voice that may be included in the audio input is similar to (e.g., has a value within a similarity threshold of) at least one stored audio feature associated with an authorized user of the machine learning model. In certain aspects, another machine learning model may be used to determine similarity between audio features. For example, a user may enroll to be an authorized user of the machine learning model, such as by providing an audio input at an enrollment phase. One or more audio features of the audio input of the user may be determined based on the audio input and stored as associated with the user, which may be an authorized user after enrollment. There may be many such authorized users, each with respective stored audio feature (s) associated with the authorized user.

In certain aspects, such determination of similarity of one or more audio features between a voice in the audio input and audio feature(s) of an authorized user of the machine learning model may have the technical effect of at least in part authorizing input to the machine learning model without first requiring examination of the content of the input.

In certain aspects, an audio input that may be obtained for a machine learning model may include multiple sounds, such as one or more voices, noise, etc. For example, a conversation with multiple voices that may include one or more commands intended for a machine learning model may be obtained using an appropriate device in an area with a high level of background noise, such as unintelligible voices or sounds that may not be intended as input to the machine learning model. In certain aspects, a voice of an authorized user may be isolated from other voices in the multiple sounds and/or noise may be filtered from the multiples sounds, such that the voice of the authorized user is separated from the other voices. For example, audio feature(s) of the voice of the authorized user may be separate from audio feature(s) of other sounds of the multiple sounds. This may provide the technical effect that even if the multiple sounds include noise or other voices that could cause security issues for the machine learning model, the actual voice of the authorized user in the multiple sounds may still be used such that the machine learning model still functions as intended by the authorized user.

In certain aspects, the multiple sounds may include the voice of the authorized user and noise, and the noise may be filtered from the multiple sounds, such as using a filtering technique (e.g., spectral subtraction or Wiener filtering), such that the filtered multiple sounds include the voice of the authorized user without the noise. In certain aspects, one or more audio features of the filtered sound may then be determined (e.g., extracted) and used for user authorization as discussed. In some cases, filtering noise from the audio input prior to determining audio feature(s) from the audio input for user authorization may reduce the computational complexity of audio feature determination and comparison to stored audio feature(s).

In certain aspects, the multiple sounds may include multiple voices and noise, and the noise may be filtered from the multiple sounds, such as using a filtering technique, such that the filtered multiple sounds include the multiple voices without the noise. In certain aspects, audio feature(s) may be determined for the multiple voices, such as based on the filtered multiple sounds together. The audio feature(s) of the multiple voices may be compared to audio feature(s) stored for authorized users, and if there is similarity between audio feature(s) of one of the multiple voices and audio feature(s) stored for authorized users, the corresponding voice may be a voice of an authorized user. The voice of the authorized user may then be isolated from the multiple voices, such as using a speaker diarization algorithm, e.g., Probabilistic Linear Discriminant Analysis (PLDA), to isolate the different voice sounds based on detected characteristics of each voice, e.g., pitch, tone, or pronunciation. In certain aspects, such as the event that a conversation is obtained and multiple voice sounds from the same speaker are not continuous, e.g., one voice followed by a response and then another response, a clustering method, e.g., k-means, DBSCAN (Density-Based Spatial Clustering of Applications with Noise), or Gaussian Mixture Models (GMMs), may be used to group voice sounds belonging to each speaker.

In certain aspects, the multiple sounds may include multiple voices and noise, and the noise may be filtered from the multiple sounds, such as using a filtering technique, such that the filtered multiple sounds include the multiple voices without the noise. The multiple voices may then be isolated into multiple isolated voices. Audio feature(s) may be determined separately for each of the multiple isolated voices. The audio feature(s) of the multiple isolated voices may be compared to audio feature(s) stored for authorized users, and if there is similarity between audio feature(s) of one of the multiple isolated voices and audio feature(s) stored for authorized users, the corresponding isolated voice may be a voice of an authorized user.

In certain aspects, the multiple sounds may include multiple voices and noise. In certain aspects, audio feature(s) may be determined for the multiple sounds (e.g., including the noise), such as based on the filtered multiple sounds together. The audio feature(s) of the multiple sounds may be compared to audio feature(s) stored for authorized users, and if there is similarity between audio feature(s) of one of the multiple sounds and audio feature(s) stored for authorized users, the corresponding sounds (e.g., voice) may be a voice of an authorized user. The voice of the authorized user may then be isolated from the multiple sounds, such as using a speaker diarization algorithm to isolate the different sounds based on detected characteristics of each sound.

In certain aspects, the multiple sounds may include multiple voices and noise. The multiple sounds may then be isolated into multiple isolated sounds. Audio feature(s) may be determined separately for each of the multiple isolated sounds. The audio feature(s) of the multiple isolated sounds may be compared to audio feature(s) stored for authorized users, and if there is similarity between audio feature(s) of one of the multiple isolated sounds and audio feature(s) stored for authorized users, the corresponding isolated sounds (e.g., voice) may be a voice of an authorized user.

In certain aspects, techniques for determining whether a content of the audio input is malicious or a potential attack attempt may include generating a text representation of an authorized voice (e.g., isolated from other noise or voices as discussed), and determining whether content of the text representation is malicious or a potential attack attempt. Using a text representation to determine whether content of the audio input is malicious or a potential attack attempt may provide the technical benefit that the text representation requires less computational resources to process than directly processing the audio input itself.

In certain aspects, a text representation of the authorized audio input (e.g., authorized voice, such as isolated from other noise or voices as discussed) may be generated using a speech to text algorithm, e.g., a Hidden Markov model or artificial neural network. The text representation of the authorized audio input may be given an attack score based on the likelihood of the text comprising an attack on the machine learning model. In certain aspects, an attack threshold value or range may be defined and utilized to determine if, based on the text representation, the authorized audio input is a threat to the machine learning model. In certain aspects, another machine learning model trained to act as a malicious language detector, such as Intuit GenSRF®, may be utilized to determine whether, based on the text representation, the authorized audio input is likely an attack on the original machine learning model, such as by generating an attack score. If the authorized audio input is not considered an attack (e.g., the attack score is less than an attack threshold) then the authorized audio input itself, or the text representation, may be sent to the machine learning model for processing. If the authorized audio input is considered an attack (e.g., the attack score is greater than or equal to an attack threshold) then neither the authorized audio input itself, nor the text representation, may be sent to the machine learning model for processing.

Example System for Authorizing Machine Learning Model Input

FIG. 1 depicts a system 100 authorizing audio input 102 for machine learning model 130. The system 100 may include an audio input processor and authorizer 110 that, in certain aspects, may isolate a voice from sounds, such as noise or other voices, in audio input 102 and may authorize the voice based on one or more audio features of the voice. The resulting audio that is authorized may be referred to as authorized audio input 104. The system 100 may also include an attack detector 120 that may generate a text representation of authorized audio input 104 and determine whether content of the authorized audio input 104 may pose a threat to machine learning model 130. Where the attack detector 120 determines that the authorized audio input 104 does not pose a threat to machine learning model 130, either or both of the text representation and the authorized audio input 104 may be sent as input to machine learning model 130 based on this determination. Machine learning model 130 may be any machine learning model configured to take audio input (or text input based on audio) such as a voice assistant model.

Audio input 102 may be obtained using any appropriate method. For example, the system 100 may include one or more microphones configured to obtain audio input 102. In certain aspects, audio input 102 may be obtained from a separate device that sends the audio input 102 to system 100. The audio input 102 may include one or more sounds. In certain aspects, the audio input 102 may include a single voice as a sound. In certain aspects, the audio input may include multiple sounds, such as a voice and noise, multiple voices, or multiple voices and noise.

As will be discussed in more detail with respect to FIGS. 2A-2D, audio input processor and authorizer 110 may process the one or more sounds, such as determine one or more audio features for a voice. Further, the audio input processor and authorizer 110 may authorize the voice based on the one or more audio features. For example, the audio input processor and authorizer 110 may determine if the one or more audio features are similar (e.g., within a similarity threshold) of one or more stored audio features associated with an authorized user.

In certain aspects, such as where the audio input includes multiple sounds, in order to determine the one or more audio features for the voice, the audio input processor and authorizer 110 may filter noise from the multiple sounds, isolate the multiple sounds, and/or determine audio feature(s) for each of one or more of the multiple sounds.

In certain aspects, audio samples may be collected from authorized user(s) of machine learning model 130 and may be processed to determine audio feature(s) associated with the authorized user(s). For example, for a given authorized user, an audio sample may be obtained, such as via a microphone or from another device, and one or more audio features may be determined for the audio sample. The one or more audio features may be stored as associated with the authorized user.

As will be discussed below with respect to FIG. 3, attack detector 120 may generate a text representation of authorized audio input 104, such as using a speech-to-text model or other speech-to-text process and calculate an attack score for the text representation. Attack detector 120 may determine whether the attack score satisfies an attack threshold. Where the attack detector 120 determines the attack score satisfies the attack threshold, the attack detector 120 may determine the content of the authorized audio input 104 is a potential threat, and does not pass the authorized audio input 104 or the corresponding text representation to machine learning model 130. Where the attack detector 120 determines the attack score does not satisfy the attack threshold, the attack detector 120 may determine the content of the authorized audio input 104 is not a potential threat, and pass the authorized audio input 104 or the corresponding text representation to machine learning model 130.

Example System for Authorizing Voice Input

FIGS. 2A-2D depict examples of the audio input processor and authorizer 110 in more detail (shown as example audio input processor and authorizer 110*a*-110*d*, wherein common characteristics between the examples are discussed with respect to "audio input processor and authorizer 110"), configured to authorize an audio input.

Figure 2A:
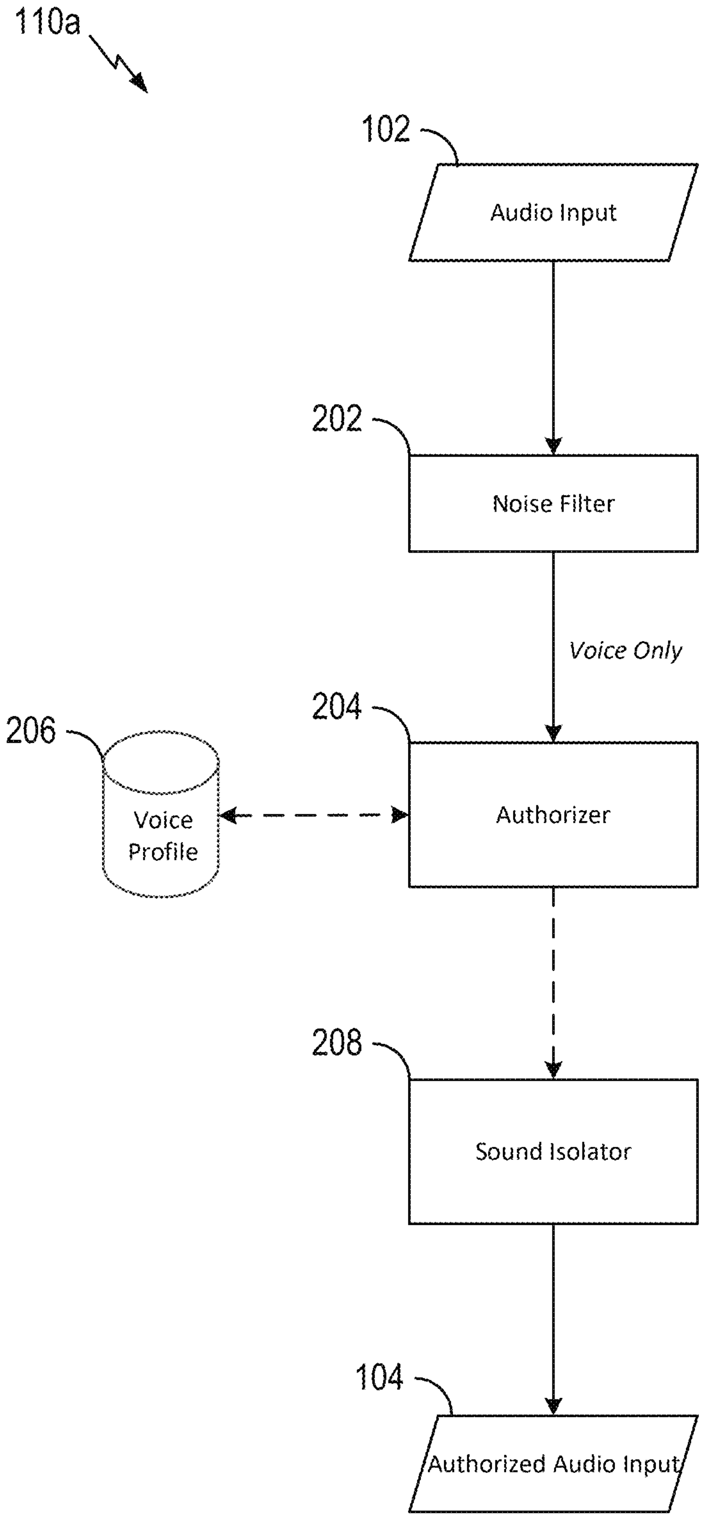
FIGS. 2A-2D depict example systems configured to filter, isolate, and authorize an audio input to a machine learning model.

For example, as shown in FIG. 2A, audio input processor and authorizer 110 may include noise filter 202, which may be used to filter noise from one or more sounds, resulting in filtered one or more sounds. For example, the noise filter 202 may be configured to separate one or more voices from other noise in the one or more sounds of audio input 102, such as using a filter, e.g., spectral subtraction or Wiener. The resulting filtered one or more sounds, accordingly, may include one or more voices. For example, the filtered one or more sounds may include a plurality of voices.

Authorizer 204 may be configured to determine one or more respective audio features for each of the filtered one or more sounds. The authorizer 204 may also be configured to determine whether the one or more respective audio features for each of the filtered one or more sounds are within a similarity threshold of one or more stored audio features associated with an authorized user.

For example, as discussed, one or more voice profiles 206 may be stored, where each voice profile is associated with an authorized user and includes one or more stored audio features associated with the authorized user. Each voice profile 206 may be generated based on an audio sample taken from an authorized user, as discussed.

In certain aspects, the authorizer 204 of FIG. 2A may determine whether a given one or more audio features for a sound (e.g., voice) are within a similarity threshold of one or more stored audio features associated with any of one or more authorized users, such as using voice profile(s) 206. In certain aspects, authorizer 204 is configured to determine whether a difference in value(s) for (e.g., each of, an average of, a weighted average of, etc.) the one or more audio features and one or more stored audio features are within the similarity threshold. In certain aspects, a second machine learning model, e.g., a machine learning classifier, may be trained and utilized to determine whether a given one or more audio features for a sound (e.g., voice) are within a similarity threshold of one or more stored audio features associated with any of one or more authorized users. In some cases, such a second machine learning model may be trained on audio inputs labelled with data indicating if they correspond to an authorized user. In some cases, the second machine learning model may be a voice similarity detection model that may not be trained on specific authorized user data, but rather takes as input different audio features and/or audio inputs, and see if they are similar.

In some cases, the audio feature(s) of one sound may be similar to stored audio feature(s) associated with one authorized user. Such sound (e.g., voice) may accordingly be isolated and the corresponding audio may be the authorized audio input, as further discussed. In some cases, the respective audio feature(s) of multiple sounds may be similar to stored audio feature(s) associated with respective authorized users. Such sounds (e.g., voices) may accordingly be separately isolated and the corresponding audio inputs may be separate authorized audio inputs.

As shown in FIG. 2A, audio input processor and authorizer 110 may also include a sound isolator 208, which may isolate voices by speaker using appropriate methods, e.g., a speaker diarization algorithm, e.g., Probabilistic Linear Discriminant Analysis (PLDA). For instance, if multiple voices are detected in the audio input 102, characteristics such as pitch, tone or pronunciation may be used to isolate one voice from another. In certain aspects, the filtered one or more sounds may be further split into voice segments that may be clustered according to a determined speaker using an appropriate method, e.g., k-means, DBSCAN (Density-Based Spatial Clustering of Applications with Noise), or Gaussian Mixture Models (GMMs). A corresponding voice, e.g., the voice segments corresponding to the one or more audio features that are within the similarity threshold of the one or more stored features of an authorized user, may be determined. The corresponding voice may be isolated from the filtered one or more sounds using sound isolator 208, resulting in authorized audio input 104.

Figure 2B:
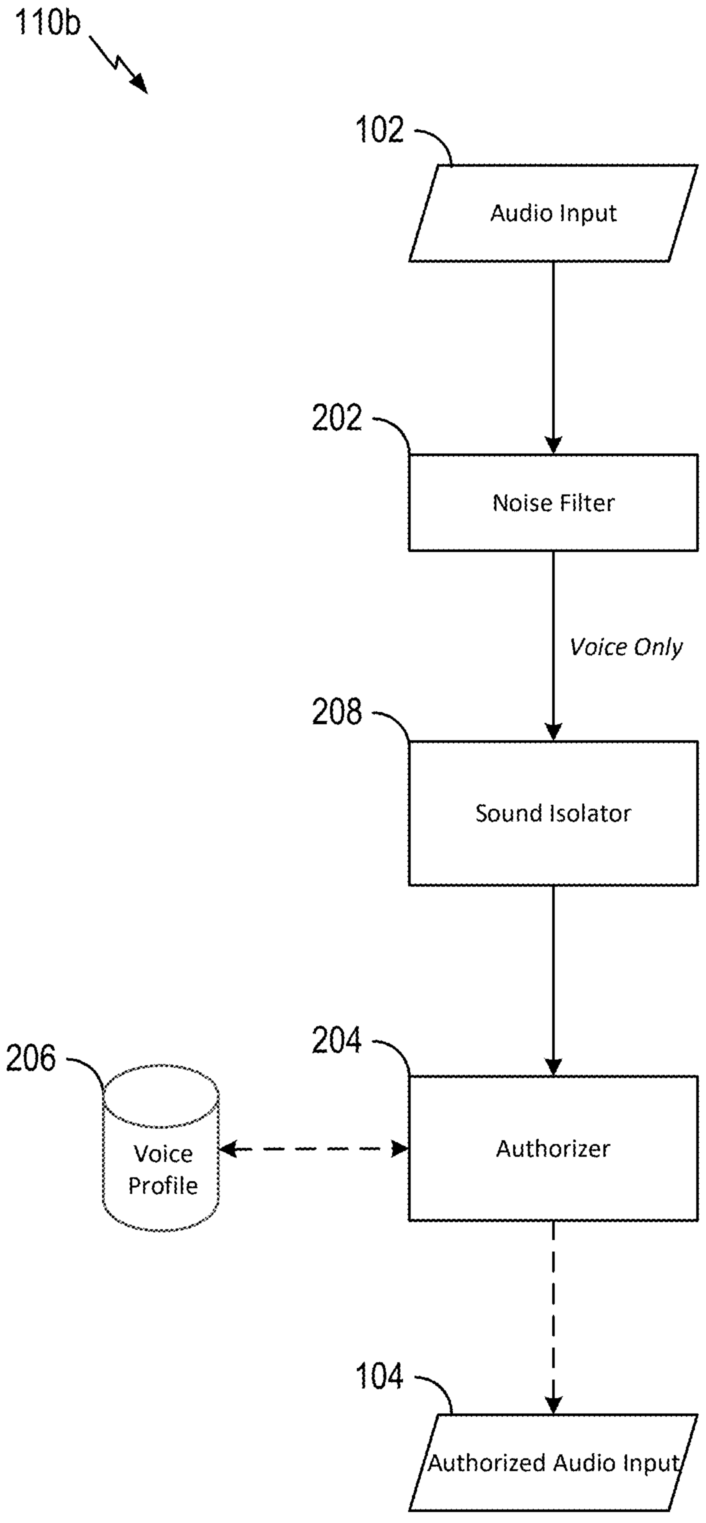

In the example of FIG. 2B, as discussed with respect to FIG. 2A, noise filter 202 may similarly filter noise from one or more sounds, and the filtered one or more sounds may comprise a plurality of voices. However, as shown in FIG. 2B, sound isolator 208 may isolate the plurality of voices into individual voices as described above, prior to determining audio feature(s) for the filtered one or more sounds. Thus, the input to authorizer 204 may be separated into individual voices such that authorizer 204 may determine the one or more audio features for each voice in the plurality of voices separately. In the example of FIG. 2B, once the authorizer 204 determines that the one or more audio features for a first voice is within the similarity threshold of one or more stored audio features of an authorized user of machine learning model 130, the first voice may become authorized audio input 104.

Figure 2C:
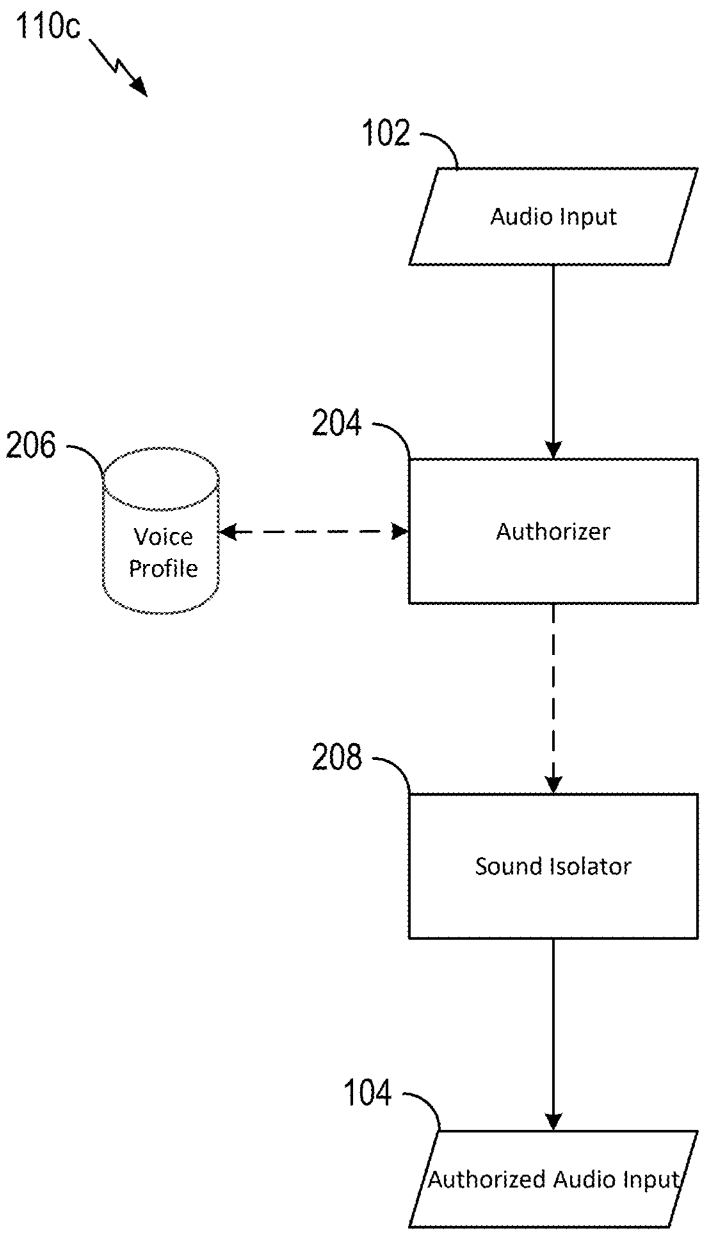

In the example of FIG. 2C, audio input 102 including one or more sounds may be first input to authorizer 204, e.g., without using noise filter 202 or sound isolator 208. As a result, the input to authorizer 204 may include, for example, a plurality of sounds, such as including noise and a plurality of voices. Accordingly, authorizer 204 may determine audio feature(s) for each of the plurality of sounds. The authorizer 204 may be configured to determine whether the one or more respective audio features for each of the plurality of sounds are within a similarity threshold of one or more stored audio features associated with an authorized user. A corresponding voice, e.g., the voice segments corresponding to the one or more audio features that are within the similarity threshold of the one or more stored features of an authorized user, may be determined. The corresponding voice may be isolated from the one or more sounds using sound isolator 208, resulting in authorized audio input 104.

Figure 2D:
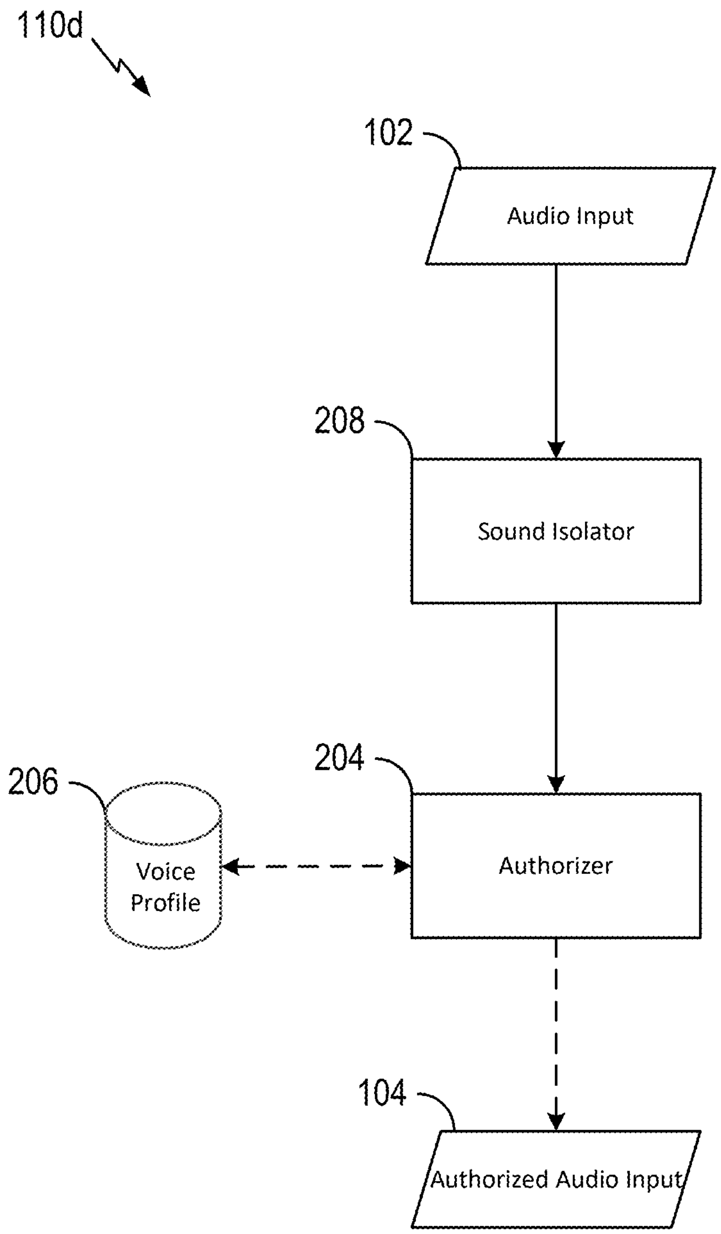

In the example shown in FIG. 2D, audio input 102 including one or more sounds, such as a plurality of sounds, may be directly sent to sound isolator 208. For example, the plurality of sounds may include noise and a plurality of voices. In certain aspects, sound isolator 208 may isolate one sound from another as described above. Thus, the input to authorizer 204 may be separated into individual sounds such that authorizer 204 may determine the one or more audio features of each sound in the plurality of sounds separately. In this example, once the authorizer 204 determines that the one or more audio features for a first sound (e.g., first voice) is within the similarity threshold of one or more stored audio features of an authorized user of machine learning model 130, the first sound may become authorized audio input 104.

Example System for Providing Authorized Input to a Machine Learning Model

Figure 3:
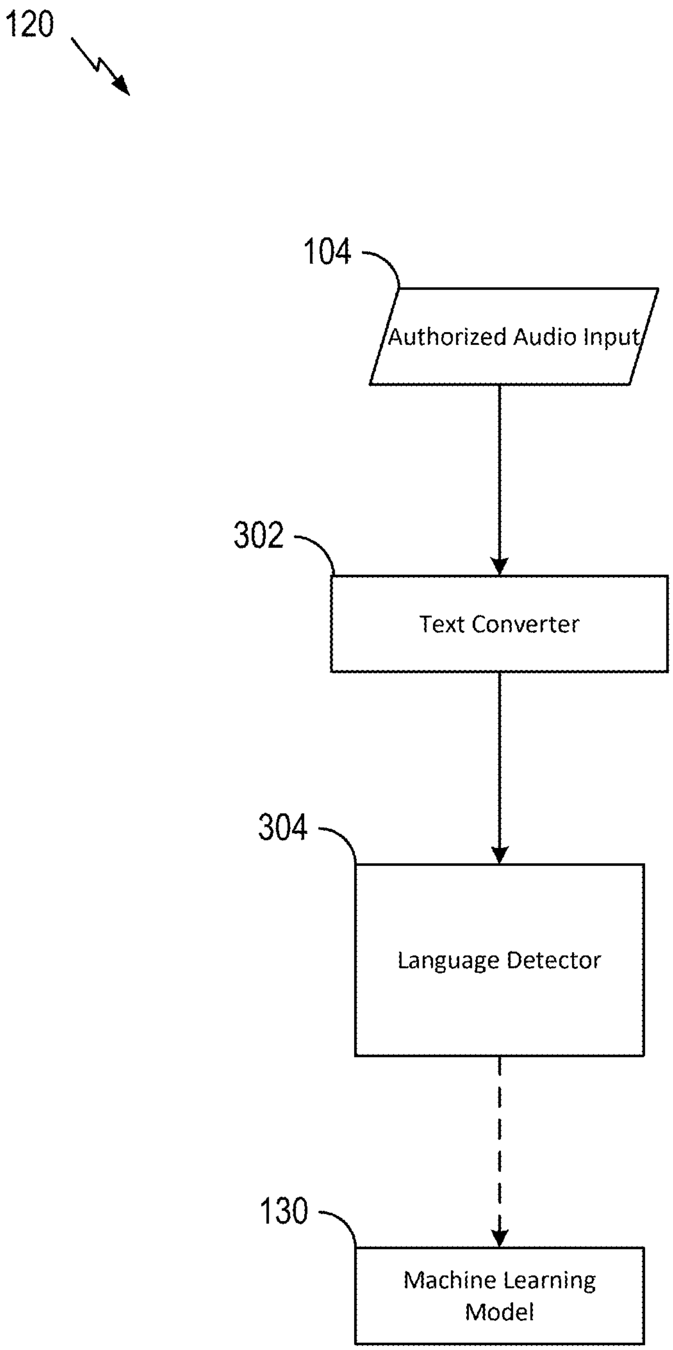
FIG. 3 depicts an example system for providing authorized input to a machine learning model.

FIG. 3 depicts an example of the attack detector 120 in more detail, which may be used to generate a text representation of authorized audio input 104 and determine whether authorized audio input 104 poses a potential attack on machine learning model 130.

As shown in FIG. 3, authorized audio input 104 may be received and text converter 302 may generate a text representation of authorized audio input 104 using a speech to text algorithm, e.g., a Hidden Markov model or artificial neural network. The text representation of authorized audio input 104 may be given an attack score, e.g., a profanity score, an abusive content score, an offensive language score, a prompt leakage score, a prompt injection score, an input bias score, or a consolidated toxicity score, by language detector 304 based on the likelihood of the text comprising an attack on machine learning model 130.

In certain aspects, an attack threshold may be utilized by language detector 304 to determine whether the text representation poses a potential attack on machine learning model 130. For example, if the attack score satisfies the attack threshold, the authorized audio input 104 may be considered an attack. If the attack score does not satisfy the attack threshold, authorized audio input 104 may not be considered an attack.

In certain aspects, language detector 304 may be a second machine learning model trained to act as a malicious language detector, such as Intuit GenSRF® or the like. The second machine learning model may be trained and utilized to determine whether the text representation poses a potential attack. Such a second machine learning model may be trained using one or more text representations, as well as labeled data indicating an attack score for each of the one or more text representations. Once trained, the second machine learning model may determine an attack score and/or whether the text representation of authorized audio input 104 poses a potential attack on machine learning model 130.

In certain aspects, a text representation of the authorized audio input that satisfies the attack threshold or may be determined to comprise an attack on machine learning model 130, may be discarded, while a text representation that does not comprise an attack on machine learning model 130 may be sent as input to machine learning model 130. In certain aspects, the authorized audio input 104 may be directly sent to machine learning model 130, either in addition to the text representation or instead of the text representation of the authorized audio input 104, such as based on an input modality of the machine learning model 130.

Example Method for Authorizing Machine Learning Model Input

Figure 4:
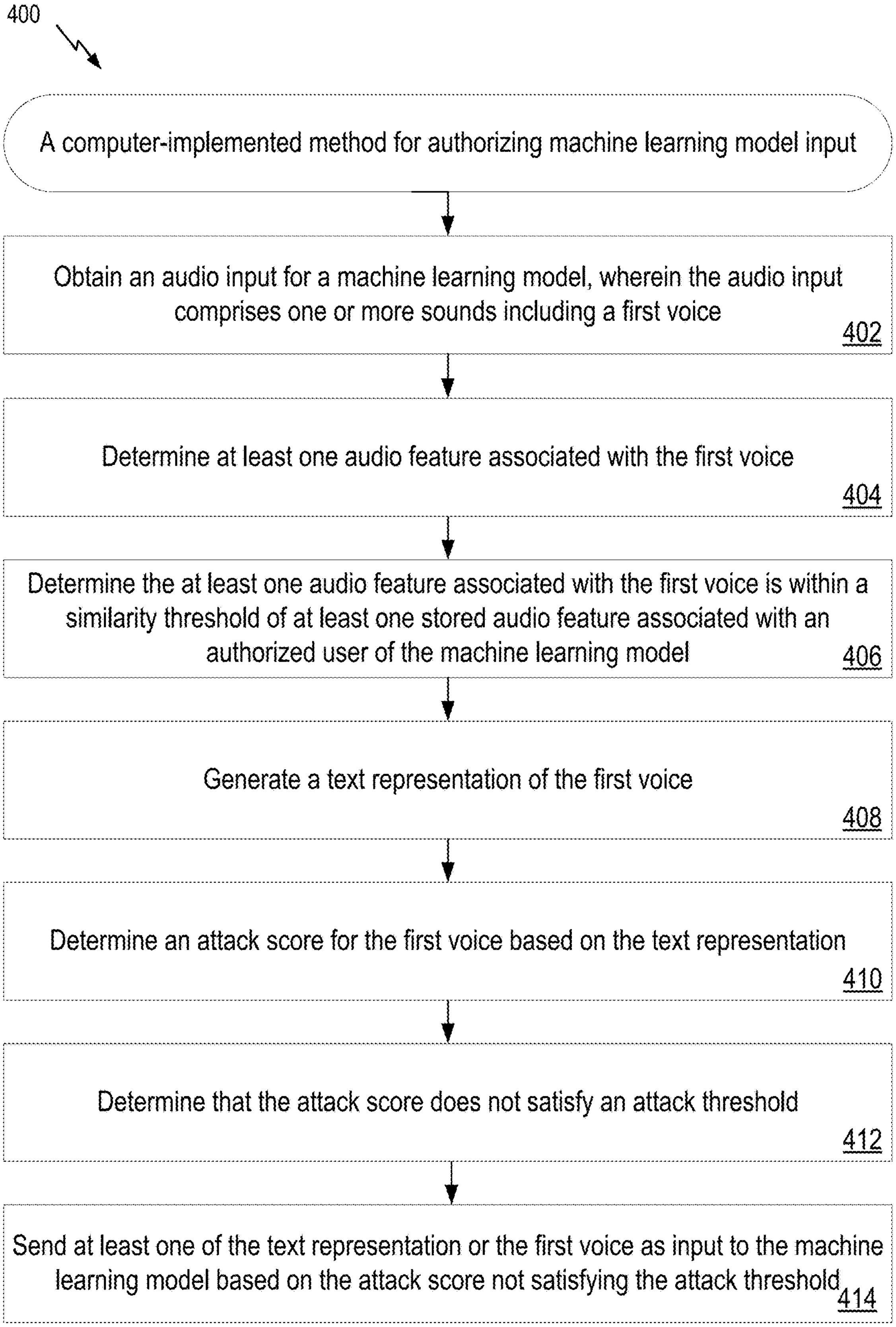
FIG. 4 depicts an example method for authorizing machine learning model input.

FIG. 4 depicts an example method 400 for authorizing machine learning model input. In one aspect, method 400 can be implemented by the system 100 of FIG. 1 and/or processing system 500 of FIG. 5.

Method 400 begins at block 402 with obtaining an audio input for a machine learning model, wherein the audio input comprises one or more sounds including a first voice.

Method 400 then proceeds to block 404 with determining at least one audio feature associated with the first voice.

Method 400 then proceeds to block 406 with determining the at least one audio feature associated with the first voice is within a similarity threshold of at least one stored audio feature associated with an authorized user of the machine learning model.

Method 400 then proceeds to block 408 with generating a text representation of the first voice.

Method 400 then proceeds to block 410 with determining an attack score for the first voice based on the text representation.

Method 400 then proceeds to block 412 with determining that the attack score does not satisfy an attack threshold.

Method 400 then proceeds to block 414 with sending at least one of the text representation or the first voice as input to the machine learning model based on the attack score not satisfying the attack threshold.

In some aspects, method 400 further includes filtering noise from the one or more sounds, wherein block 404 is based on the filtered one or more sounds.

In some aspects, the filtered one or more sounds comprise a plurality of voices including the first voice; block 404 includes determining a plurality of audio features, including the at least one audio feature, associated with the plurality of voices based on the filtered one or more sounds; and block 406 includes determining, among the plurality of audio features, the at least one audio feature associated with the first voice is within the similarity threshold. In some aspects, method 400 includes, based on determining the at least one audio feature associated with the first voice is within the similarity threshold, isolating the first voice from the filtered one or more sounds.

In some aspects, method 400 further includes isolating each of a plurality of voices, including the first voice, from the filtered one or more sounds, wherein: block 404 includes determining a plurality of audio features, including the at least one audio feature, associated with the plurality of voices based on each of the isolated plurality of voices; and block 406 comprising determining, among the plurality of audio features, the at least one audio feature associated with the first voice is within the similarity threshold.

In some aspects, block 404 includes determining a plurality of audio features, including the at least one audio feature, associated with the one or more sounds; block 406 includes determining, among the plurality of audio features, the at least one audio feature associated with the first voice is within the similarity threshold; and the method 400 further includes, based on determining the at least one audio feature associated with the first voice is within the similarity threshold, isolating the first voice from the one or more sounds.

In some aspects, the one or more sounds comprise one or more of: noise; or a plurality of voices.

In some aspects, method 400 further includes isolating each of the one or more sounds, including the first voice, wherein: block 404 includes determining a plurality of audio features, including the at least one audio feature, associated with the one or more sounds based on each of the isolated one or more sounds; and block 406 includes determining, among the plurality of audio features, the at least one audio feature associated with the first voice is within the similarity threshold.

In some aspects, the one or more sounds comprise one or more of: noise; or a plurality of voices.

In some aspects, method 400 further includes receiving an audio sample from the authorized user.

In some aspects, method 400 further includes determining the at least one stored audio feature from the audio sample.

In some aspects, block 410 includes determining one or more of: a profanity score; an abusive content score; an offensive language score; a prompt leakage score; a prompt injection score; an input bias score; or a consolidated toxicity score.

In some aspects, block 406 includes utilizing a second machine learning model.

In some aspects, the at least one audio feature comprises one or more of: a frequency, a power, an energy, a zero-crossing rate, a tempo, or jitter.

Figure 5:
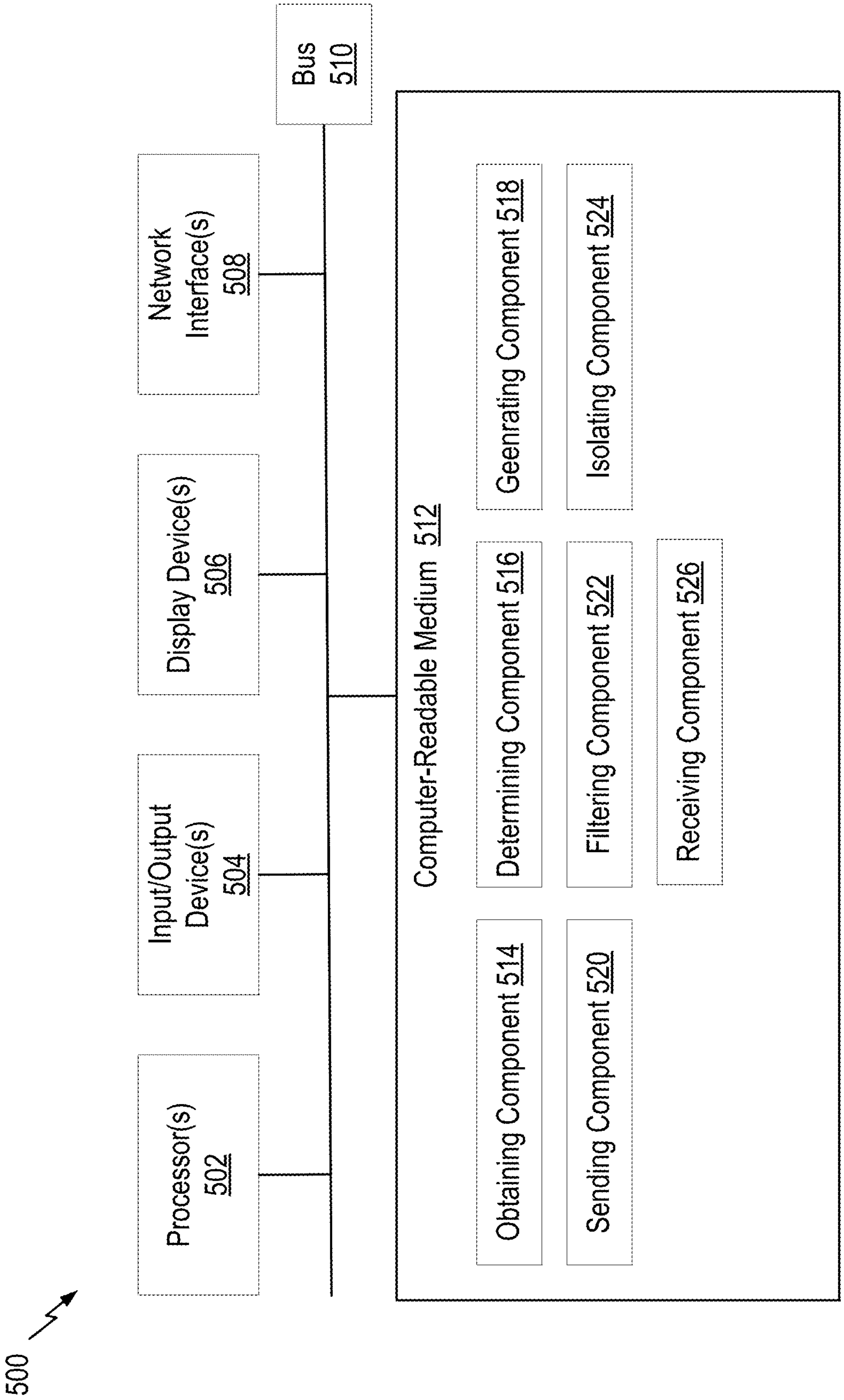
FIG. 5 depicts an example processing system with which aspects of the present disclosure can be performed.

In some aspects, method 400, or any aspect related to it, may be performed by an apparatus or processing system, such as processing system 500 of FIG. 5, which includes various components operable, configured, or adapted to perform the method 400. Processing system 500 is described below in further detail.

Note that FIG. 4 is just one example of a method, and other methods including fewer, additional, or alternative operations are possible consistent with this disclosure.

Example Processing System for Authorizing Machine Learning Model Input

FIG. 5 depicts an example processing system 500 configured to perform various aspects described herein, including, for example, method 400 as described above with respect to FIG. 4.

Processing system 500 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of a one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes obtaining component 514, determining component 516, generating component 518, sending component 520, filtering component 522, isolating component 524, and receiving component 526. Processing of the components 514-526 may enable and cause the processing system 500 to perform the method 400 described with respect to FIG. 4, or any aspect related to it.

In certain embodiments, obtaining component 514 is configured to obtain an audio input for a machine learning model, wherein the audio input comprises one or more sounds including a first voice, as described in FIG. 4 with reference to block 402.

In certain embodiments, determining component 516 is configured to determine at least one audio feature associated with the first voice, as described in FIG. 4 with reference to block 404.

In certain embodiments, determining component 516 is configured to determine the at least one audio feature associated with the first voice is within a similarity threshold of at least one stored audio feature associated with an authorized user of the machine learning model, as described in FIG. 4 with reference to block 406.

In certain embodiments, generating component 518 is configured to generate a text representation of the first voice, as described in FIG. 4 with reference to block 408.

In certain embodiments, determining component 516 is configured to determine an attack score for the first voice based on the text representation, as described in FIG. 4 with reference to block 410.

In certain embodiments, determining component 516 is configured to determine that the attack score does not satisfy an attack threshold, as described in FIG. 4 with reference to block 412.

In certain embodiments, sending component 520 is configured to send at least one of the text representation or the first voice as input to the machine learning model based on the attack score not satisfying the attack threshold, as described in FIG. 4 with reference to block 414.

Note that FIG. 5 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A computer-implemented method for authorizing machine learning model input, the method comprising: obtaining an audio input for a machine learning model, wherein the audio input comprises one or more sounds including a first voice; determining at least one audio feature associated with the first voice; determining the at least one audio feature associated with the first voice is within a similarity threshold of at least one stored audio feature associated with an authorized user of the machine learning model; generating a text representation of the first voice; determining an attack score for the first voice based on the text representation; determining that the attack score does not satisfy an attack threshold; and sending at least one of the text representation or the first voice as input to the machine learning model based on the attack score not satisfying the attack threshold.

Clause 2: The method of Clause 1, further comprising filtering noise from the one or more sounds, wherein determining the at least one audio feature associated with the first voice is based on the filtered one or more sounds.

Clause 3: The method of Clause 2, wherein: the filtered one or more sounds comprise a plurality of voices including the first voice; determining the at least one audio feature associated with the first voice comprises determining a plurality of audio features, including the at least one audio feature, associated with the plurality of voices based on the filtered one or more sounds; and determining the at least one audio feature associated with the first voice is within the similarity threshold comprises determining, among the plurality of audio features, the at least one audio feature associated with the first voice is within the similarity threshold; and further comprising: isolating the first voice from the filtered one or more sounds based on determining the at least one audio feature associated with the first voice is within the similarity threshold.

Clause 4: The method of Clause 2, further comprising isolating each of a plurality of voices, including the first voice, from the filtered one or more sounds, wherein: determining the at least one audio feature associated with the first voice comprises determining a plurality of audio features, including the at least one audio feature, associated with the plurality of voices based on each of the isolated plurality of voices; and determining the at least one audio feature associated with the first voice is within the similarity threshold comprises determining, among the plurality of audio features, the at least one audio feature associated with the first voice is within the similarity threshold.

Clause 5: The method of Clause 1, wherein: determining the at least one audio feature associated with the first voice comprises determining a plurality of audio features, including the at least one audio feature, associated with the one or more sounds; determining the at least one audio feature associated with the first voice is within the similarity threshold comprises determining, among the plurality of audio features, the at least one audio feature associated with the first voice is within the similarity threshold; and further comprising: based on determining the at least one audio feature associated with the first voice is within the similarity threshold, isolating the first voice from the one or more sounds.

Clause 6: The method of Clause 5, wherein the one or more sounds comprise one or more of: noise; or a plurality of voices.

Clause 7: The method of Clause 1, further comprising isolating each of the one or more sounds, including the first voice, wherein: determining the at least one audio feature associated with the first voice comprises determining a plurality of audio features, including the at least one audio feature, associated with the one or more sounds based on each of the isolated one or more sounds; and determining the at least one audio feature associated with the first voice is within the similarity threshold comprises determining, among the plurality of audio features, the at least one audio feature associated with the first voice is within the similarity threshold.

Clause 8: The method of Clause 7, wherein the one or more sounds comprise one or more of: noise; or a plurality of voices.

Clause 9: The method of any one of Clauses 1-8, further comprising: receiving an audio sample from the authorized user; and determining the at least one stored audio feature from the audio sample.

Clause 10: The method of any one of Clauses 1-9, wherein determining the attack score comprises determining one or more of: a profanity score; an abusive content score; an offensive language score; a prompt leakage score; a prompt injection score; an input bias score; or a consolidated toxicity score.

Clause 11: The method of any one of Clauses 1-10, wherein determining the at least one audio feature associated with the first voice is within the similarity threshold comprises utilizing a second machine learning model.

Clause 12: The method of any one of Clauses 1-11, wherein the at least one audio feature comprises one or more of: a frequency, a power, an energy, a zero-crossing rate, a tempo, or jitter.

Clause 13: A processing system, comprising: memory comprising computer-executable instructions; and one or more processors configured to execute the computer-executable instructions and cause the processing system to perform a method in accordance with any one of Clauses 1-12.

Clause 14: A processing system, comprising means for performing a method in accordance with any one of Clauses 1-12.

Clause 15: A non-transitory computer-readable medium storing program code for causing a processing system to perform the steps of any one of Clauses 1-12.

Clause 16: A computer program product embodied on a computer-readable storage medium comprising code for performing a method in accordance with any one of Clauses 1-12.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for authorizing machine learning model input, the method comprising:
obtaining an audio input for a machine learning model, wherein the audio input comprises one or more sounds including a first voice;
determining at least one audio feature associated with the first voice;
determining the at least one audio feature associated with the first voice is within a similarity threshold of at least one stored audio feature of a voice profile associated with an authorized user of the machine learning model, wherein the voice profile is generated based on an audio sample obtained from the authorized user;
generating a text representation of the first voice;
determining an attack score for the first voice based on a likelihood that the text representation comprises an attack on the machine learning model;
determining that the attack score does not satisfy an attack threshold; and
based on the attack score not satisfying the attack threshold, sending at least one of the text representation or the first voice as authorized input to the machine learning model.

2. The method of claim 1, further comprising filtering noise from the one or more sounds, wherein:
determining the at least one audio feature associated with the first voice is based on the filtered one or more sounds.

3. The method of claim 2, wherein:
the filtered one or more sounds comprise a plurality of voices including the first voice;
determining the at least one audio feature associated with the first voice comprises determining a plurality of audio features, including the at least one audio feature, associated with the plurality of voices based on the filtered one or more sounds; and
determining the at least one audio feature associated with the first voice is within the similarity threshold comprises determining, among the plurality of audio features, the at least one audio feature associated with the first voice is within the similarity threshold; and further comprising:
based on determining the at least one audio feature associated with the first voice is within the similarity threshold, isolating the first voice from the filtered one or more sounds.

4. The method of claim 2, further comprising isolating each of a plurality of voices, including the first voice, from the filtered one or more sounds, wherein:
determining the at least one audio feature associated with the first voice comprises determining a plurality of audio features, including the at least one audio feature, associated with the plurality of voices based on the isolating of each of the plurality of voices; and
determining the at least one audio feature associated with the first voice is within the similarity threshold comprises determining, among the plurality of audio features, the at least one audio feature associated with the first voice is within the similarity threshold.

5. The method of claim 1, wherein:
determining the at least one audio feature associated with the first voice comprises determining a plurality of audio features, including the at least one audio feature, associated with the one or more sounds;
determining the at least one audio feature associated with the first voice is within the similarity threshold comprises determining, among the plurality of audio features, the at least one audio feature associated with the first voice is within the similarity threshold; and further comprising:
based on determining the at least one audio feature associated with the first voice is within the similarity threshold, isolating the first voice from the one or more sounds.

6. The method of claim 5, wherein the one or more sounds comprise one or more of:
noise; or
a plurality of voices.

7. The method of claim 1, further comprising isolating each of the one or more sounds, including the first voice, wherein:

determining the at least one audio feature associated with the first voice comprises determining a plurality of audio features, including the at least one audio feature, associated with the one or more sounds based on the isolating of each of the one or more sounds; and determining the at least one audio feature associated with the first voice is within the similarity threshold comprises determining, among the plurality of audio features, the at least one audio feature associated with the first voice is within the similarity threshold.

8. The method of claim 7, wherein the one or more sounds comprise one or more of:

noise; or a plurality of voices.

9. The method of claim 1, further comprising:

receiving the audio sample from the authorized user;

determining the at least one stored audio feature from the audio sample; and associating the at least one stored audio feature and the authorized user with the voice profile.

10. The method of claim 1, wherein determining the attack score comprises determining one or more of:

a profanity score;

an abusive content score;

an offensive language score;

a prompt leakage score;

a prompt injection score;

an input bias score; or a consolidated toxicity score.

11. The method of claim 1, wherein determining the at least one audio feature associated with the first voice is within the similarity threshold comprises utilizing a second machine learning model.

12. The method of claim 1, wherein the at least one audio feature comprises one or more of: a frequency, a power, an energy, a zero-crossing rate, a tempo, or jitter.

13. The method of claim 1, further comprising:

obtaining a second audio input for the machine learning model, wherein the second audio input comprises one or more sounds including a second voice;

determining at least one audio feature associated with the second voice;

determining the at least one audio feature associated with the second voice is within a similarity threshold of at least one stored audio feature of a second voice profile associated with a second authorized user of the machine learning model;

generating a second text representation of the second voice;

determining a second attack score for the second voice based on the second text representation;

determining that the second attack score satisfies the attack threshold; and based on the second attack score satisfying the attack threshold, discarding at least one of the second text representation or the second voice to secure the machine learning model from an attack attempt.

14. A processing system, comprising:

a memory comprising computer-executable instructions; and one or more processors configured to execute the computer-executable instructions and cause the processing system to:

obtain an audio input for a machine learning model, wherein the audio input comprises one or more sounds including a first voice;

determine at least one audio feature associated with the first voice;

determine the at least one audio feature associated with the first voice is within a similarity threshold of at least one stored audio feature of a voice profile associated with an authorized user of the machine learning model, wherein the voice profile is generated based on an audio sample from the authorized user;

generate a text representation of the first voice;

determine an attack score for the first voice based on the text representation;

determine that the attack score does not satisfy an attack threshold; and based on the attack score not satisfying the attack threshold, send at least one of the text representation or the first voice as authorized input to the machine learning model.

15. The processing system of claim 14, wherein the one or more processors are configured to execute the computer-executable instructions and further cause the processing system to:

filter noise from the one or more sounds, wherein determining the at least one audio feature associated with the first voice is based on the filtered one or more sounds.

16. The processing system of claim 15, wherein:

the filtered one or more sounds comprise a plurality of voices including the first voice;

to determine the at least one audio feature associated with the first voice, the one or more processors are configured to execute the computer-executable instructions and cause the processing system to determine a plurality of audio features, including the at least one audio feature, associated with the plurality of voices based on the filtered one or more sounds; and to determine the at least one audio feature associated with the first voice is within the similarity threshold, the one or more processors are configured to execute the computer-executable instructions and cause the processing system to determine, among the plurality of audio features, the at least one audio feature associated with the first voice is within the similarity threshold; and the one or more processors are configured to execute the computer-executable instructions and further cause the processing system to:

based on determining the at least one audio feature associated with the first voice is within the similarity threshold, isolate the first voice from the filtered one or more sounds.

17. The processing system of claim 15, wherein the one or more processors are configured to execute the computer-executable instructions and further cause the processing system to:

isolate each of a plurality of voices, including the first voice, from the filtered one or more sounds, wherein:

to determine the at least one audio feature associated with the first voice, the one or more processors are configured to execute the computer-executable instructions and cause the processing system to determine a plurality of audio features, including the at least one audio feature, associated with the plurality of voices based on the isolating each of the plurality of voices; and to determine the at least one audio feature associated with the first voice is within the similarity threshold, the one or more processors are configured to execute the computer-executable instructions and cause the processing system to determine, among the plurality of audio features, the at least one audio feature associated with the first voice is within the similarity threshold.

18. The processing system of claim 14, wherein:

to determine the at least one audio feature associated with the first voice, the one or more processors are configured to execute the computer-executable instructions and cause the processing system to determine a plurality of audio features, including the at least one audio feature, associated with the one or more sounds;

to determine the at least one audio feature associated with the first voice is within the similarity threshold, the one or more processors are configured to execute the computer-executable instructions and cause the processing system to determine, among the plurality of audio features, the at least one audio feature associated with the first voice is within the similarity threshold; and the one or more processors are configured to execute the computer-executable instructions and further cause the processing system to:

based on determining the at least one audio feature associated with the first voice is within the similarity threshold, isolate the first voice from the one or more sounds.

19. The processing system of claim 14, wherein the one or more processors are configured to execute the computer-executable instructions and further cause the processing system to:

isolate each of the one or more sounds, including the first voice, wherein:

to determine the at least one audio feature associated with the first voice, the one or more processors are configured to execute the computer-executable instructions and cause the processing system to determine a plurality of audio features, including the at least one audio feature, associated with the one or more sounds based on the isolating of each of the one or more sounds; and to determine the at least one audio feature associated with the first voice is within the similarity threshold, the one or more processors are configured to execute the computer-executable instructions and cause the processing system to determine, among the plurality of audio features, the at least one audio feature associated with the first voice is within the similarity threshold.

20. One or more non-transitory computer-readable media comprising executable instructions that, when executed by one or more processors of an apparatus, cause the apparatus to perform operations comprising:

obtaining an audio input for a machine learning model, wherein the audio input comprises one or more sounds including a first voice;

determining at least one audio feature associated with the first voice;

determining the at least one audio feature associated with the first voice is within a similarity threshold of at least one stored audio feature of a voice profile associated with an authorized user of the machine learning model, wherein the voice profile is generated based on an audio sample obtained from the authorized user;

generating a text representation of the first voice;

determining an attack score for the first voice based on the text representation;

determining that the attack score does not satisfy an attack threshold; and based on the attack score not satisfying the attack threshold, sending at least one of the text representation or the first voice as authorized input to the machine learning model.

* * * * *